(12) United States Patent
Bechtel et al.

(10) Patent No.: US 7,087,893 B2
(45) Date of Patent: *Aug. 8, 2006

(54) LIGHT SENSOR CONFIGURATIONS FOR AUTOMATIC VEHICLE EQUIPMENT CONTROL HAVING AN INTEGRALLY FORMED ENCAPSULANT

(75) Inventors: Jon H. Bechtel, Holland, MI (US); Harold C. Ockerse, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/216,354

(22) Filed: Aug. 31, 2005

(65) Prior Publication Data

US 2006/0006319 A1   Jan. 12, 2006

Related U.S. Application Data

(63) Continuation of application No. 10/853,541, filed on May 25, 2004, now Pat. No. 6,943,342, and a continuation of application No. 10/068,540, filed on Feb. 6, 2002, now Pat. No. 6,831,268, and a continuation-in-part of application No. 10/043,977, filed on Jan. 10, 2002, now Pat. No. 6,679,608.

(51) Int. Cl.
*H01J 40/14*   (2006.01)

(52) U.S. Cl. ..................... 250/239; 250/216
(58) Field of Classification Search ............... 250/239, 250/216
See application file for complete search history.

(56) References Cited

U.S. PATENT DOCUMENTS 2,762,930 A * 9/1956 Onksen, Jr. et al. ........ 250/215

* cited by examiner

*Primary Examiner*—Que T. Le
(74) *Attorney, Agent, or Firm*—James E. Shultz, Jr.

(57) ABSTRACT

The inventive sensor device includes a support structure, a sensing element mounted on the support substrate for sensing optical radiation and generating an electrical output signal in response thereto, and an encapsulant encapsulating the sensing element on the support structure. The encapsulant being configured to define a lens portion for focusing incident optical radiation onto an active surface of the sensing element, and an optical radiation collector portion surrounding the lens portion for collecting and redirecting optical radiation that is not incident the lens portion onto the active surface of the sensing element. The collector portion may be a parabolic reflector that reflects incident light by total internal reflection. The sensor device may be incorporated into an assembly including a diffuser positioned across an aperture, and/or may be incorporated into a vehicle accessory such as a rearview mirror assembly.

20 Claims, 12 Drawing Sheets

LIGHT SENSOR CONFIGURATIONS FOR AUTOMATIC VEHICLE EQUIPMENT CONTROL HAVING AN INTEGRALLY FORMED ENCAPSULANT

CROSS-REFERENCE TO RELATED APPLICATIONS

This application is a continuation of U.S. patent application Ser. No. 10/853,541 filed on May 25, 2004, now U.S. Pat. No. 6,943,342, by Jon H. Bechtel et al. entitled "LIGHT SENSOR CONFIGURATION," a continuation of U.S. patent application Ser. No. 10/068,540, filed on Feb. 6, 2002, by Jon H. Bechtel et al. entitled "SENSOR CONFIGURATION FOR SUBSTANTIAL SPACING FROM A SMALL APERTURE," now U.S. Pat. No. 6,831,268 and a continuation-in-part of U.S. patent application Ser. No. 10/043,977 filed on Jan. 10, 2002, by Jon H. Bechtel et al. entitled "SENSOR DEVICE HAVING AN ANAMORPHIC LENS," now U.S. Pat. No. 6,679,608, the disclosures of which are incorporated herein by reference in its entirety.

BACKGROUND OF THE INVENTION

The present invention generally relates to an optical radiation sensor device, and more particularly to a sensor device incorporating a photosensor.

Light sensors are used in a large number of different applications. In such light sensing applications, several characteristics of the sensing mechanism need to be in acceptable ranges and some further need to be characterized for specific light sensing applications. Other characteristics of the sensor may increase the range of applications for which the sensor is suitable and/or may provide for easier or more economical design applications. One characteristic for which general requirements vary significantly from one application to another is the angular response characteristic, i.e., the angular response profile, of the sensor which is needed for the particular application. A second characteristic is the optical gain, which for low light level measurements is preferably high enough to make stable measurements of the lowest light levels which need to be detected by the system. A third characteristic is the need to provide a relatively small, aesthetically attractive, space efficient aperture in the device for entrance of the light to be measured. A fourth characteristic is to allow substantial and preferably variable distance to separate the aperture from the electronic sensing device. A fifth characteristic is to utilize separate components to sense the light and to characterize the angular response characteristic so that the sensor may be used in a broad range of applications leading to increased standardization of the light sensing component.

Sensor devices of the type used to detect light are constructed in a variety of packages. For example, photoresistive sensors are often mounted on a circuit board with or without a separate lens positioned in front of the sensor. Some photodiodes have been constructed in which the sensor die is mounted to a lead frame and is encapsulated by a clear epoxy. A portion of the epoxy encapsulant is molded into a lens so as to focus incident light onto the sensor die. Such lenses have been either spherical or other surfaces of revolution that are symmetric about an axis which is generally perpendicular to the surface of the active sensing element. Unlike a sensor construction in which a separate lens is spaced from the sensor, the lens in these types of sensor devices is an integral part of the sensor and the space separating the sensor and the lens has been eliminated. The main design difference which results from filling the space between the lens and the sensor with plastic is that the speed of propagation of the light rays is reduced being inversely proportional to the index of refraction of the lens material. This effectively increases the focal length of the lens in proportion to the index of refraction of the material.

FIGS. 4a and 4b illustrate two general sensing configurations, each with similar angular response characteristics but with widely differing optical gains. In the first sensor configuration in FIG. 4a, the sensor is close to the aperture and has desirably high optical gain. Placement of the sensor close to the aperture often leads to the added cost of additional parts and assembly processes, and longer electrical connecting paths to the sensor often compromises the electrical design. In the second sensor configuration in FIG. 4b, the sensor is placed at an appreciable distance from the aperture and has undesirably low optical gain. The placement of the sensor may be convenient and less costly but for the overall design the reduction in optical gain, which may be severe, may compromise or even prevent satisfactory performance.

The angle between lines 41a and 42a and between lines 41b and 42b are the same in each of the illustrative examples and denote the nominal angle between the 50 percent response points in the optical angular response profile for each of the sensors. Light blocking portions of the housing 44a and 45a are depicted in FIG. 4a in fragmentary view on opposing sides of the aperture which contains a lens 43a. With the sensing element 48a placed closer to the case than the point 49a of intersection of the lines 41a and 42a which depict the optical aperture, the lens, possibly combined with diffusion and/or de-focusing, may serve to decrease the viewing aperture from the angle between lines 46a and 47a to that between lines 41a and 42a as targeted by the design. The lens 43a serves to concentrate light impinging on the sensor thereby increasing its optical gain. Thus, the desired reduction in the overall field of view is accomplished while increasing the optical gain of the system. The general requirement for this to work with a single, thin lens in a non-light piped mode is for the sensor 48a to be located closer to the aperture than the apex 49a of the conic surface depicted by lines 46a and 47a in FIG. 4a. The conic surface may be non-circular and is used only as a temporary gage for illustrative or design purposes. With the lens and/or filter removed, the conic surface is aligned in the required viewing direction and inserted as far as possible into the aperture opening which is provided. (The regions which are generally closer to the apertures than the points 49a or 49b may be referred to as the near field regions of the respective aperture.)

Light blocking portions of the housing 44b and 45b are depicted in FIG. 4b in fragmentary view on opposing sides of the aperture which contains a diffusing lens and/or surface 43b. In this case, sensor 48b is farther from the aperture than the apex 49b. The property of point 49b is similar to that of 49a. An alternative way to describe it is as the point on the sensor side of the aperture which is the most distant point from the aperture from which the full field for which the sensor should respond to incident light or a substantial portion thereof may be seen prior to placing an optical element in the aperture. In this case, the sensor 48b is more distant from the aperture than the point 49b so that the angle between lines 46b and 47b is less than the angle between lines 41b and 42b. In three-dimensional terms, the solid angle subtended by the aperture at point 48b where the sensor is located is smaller than the solid angle subtended by the aperture at point 49b where the desired field for response to incident light may be seen through the aperture with the lens and/or filter removed. In this case, an optical element 43b, which has a diffusing effect, may be incorporated in the aperture and if the diffusing effect is pronounced enough to bend enough rays coming from representative directions 41b and 42b to the extent that they may strike the sensor 48b, a balance may be found for which the diffusing effect expands the effective viewing field from that indicated by the angle between 46b and 47b to that between 41b and 42b, as required to meet the design objective. The disadvantage is that instead of concentrating the light and adding optical gain as was accomplished in the first example, the light level is effectively attenuated because rays that would have come unobstructed through the aperture and struck the sensor before placing the diffuser in it are now spread out by the disbursing effect of the diffuser so that the proportion of the rays which reach the sensor is diminished. Accordingly, there exists the need for a sensor device construction that may be placed within a housing a distance from an aperture through the housing without sacrificing optical gain.

SUMMARY OF THE INVENTION

Accordingly, it is an aspect of the present invention to provide a sensor device that comprises: a support structure; a sensing element mounted on the support substrate for sensing optical radiation and generating an electrical output signal in response thereto; and an encapsulant encapsulating the sensing element on the support structure. The encapsulant is configured to define a lens portion for focusing incident optical radiation onto an active surface of the sensing element, and an optical radiation collector portion surrounding the lens portion for collecting and redirecting optical radiation that is not incident on the lens portion onto the active surface of the sensing element.

According to another embodiment, a sensor assembly comprises: a housing having an aperture; a diffusing element positioned across the aperture; and a sensor device comprising: a support structure; a sensing element mounted on the support structure for sensing optical radiation and generating an electrical signal in response thereto; and an encapsulant encapsulating the sensing element on the support structure, the encapsulant being configured to define an optical radiation collector portion having a parabolic reflecting surface for collecting and redirecting incident optical radiation towards the sensing element by total internal reflection.

According to another embodiment, a vehicle accessory for mounting in a vehicle is provided that comprises: a sensor device comprising: a support structure; a sensing element mounted on the support structure for sensing optical radiation and generating an electrical output in response thereto; and an encapsulant encapsulating the sensing element on the support structure. The encapsulant is configured to define a lens portion for focusing incident optical radiation onto an active surface of the sensing element, and an optical radiation collector portion surrounding the lens portion for collecting and redirecting optical radiation that is not incident the lens portion onto the active surface of the sensing element.

According to another embodiment, a vehicle accessory for mounting in a vehicle is provided that comprises: a housing having an aperture; a diffusing element positioned across the aperture; and a sensor device comprising: a support structure; a sensing element mounted on the support structure for sensing optical radiation and generating an electrical signal in response thereto; and an encapsulant encapsulating the sensing element on the support structure, the encapsulant being configured to define an optical radiation collector portion having a parabolic reflecting surface for collecting and redirecting incident optical radiation towards the sensing element by total internal reflection.

According to another embodiment, a sensor device comprises: a support structure; a sensing element mounted on the support structure for sensing optical radiation and generating an electrical output in response thereto; and an encapsulant encapsulating the sensing element on the support structure, the encapsulant including an integral lens for directing incident optical radiation toward the sensing element; and a light collector surrounding the integral lens for collecting and redirecting optical radiation that is not incident the lens onto the active surface of the sensing element.

These and other features, advantages, and objects of the present invention will be further understood and appreciated by those skilled in the art by reference to the following specification, claims, and appended drawings.

DETAILED DESCRIPTION OF THE PREFERRED EMBODIMENT

Figure 1:
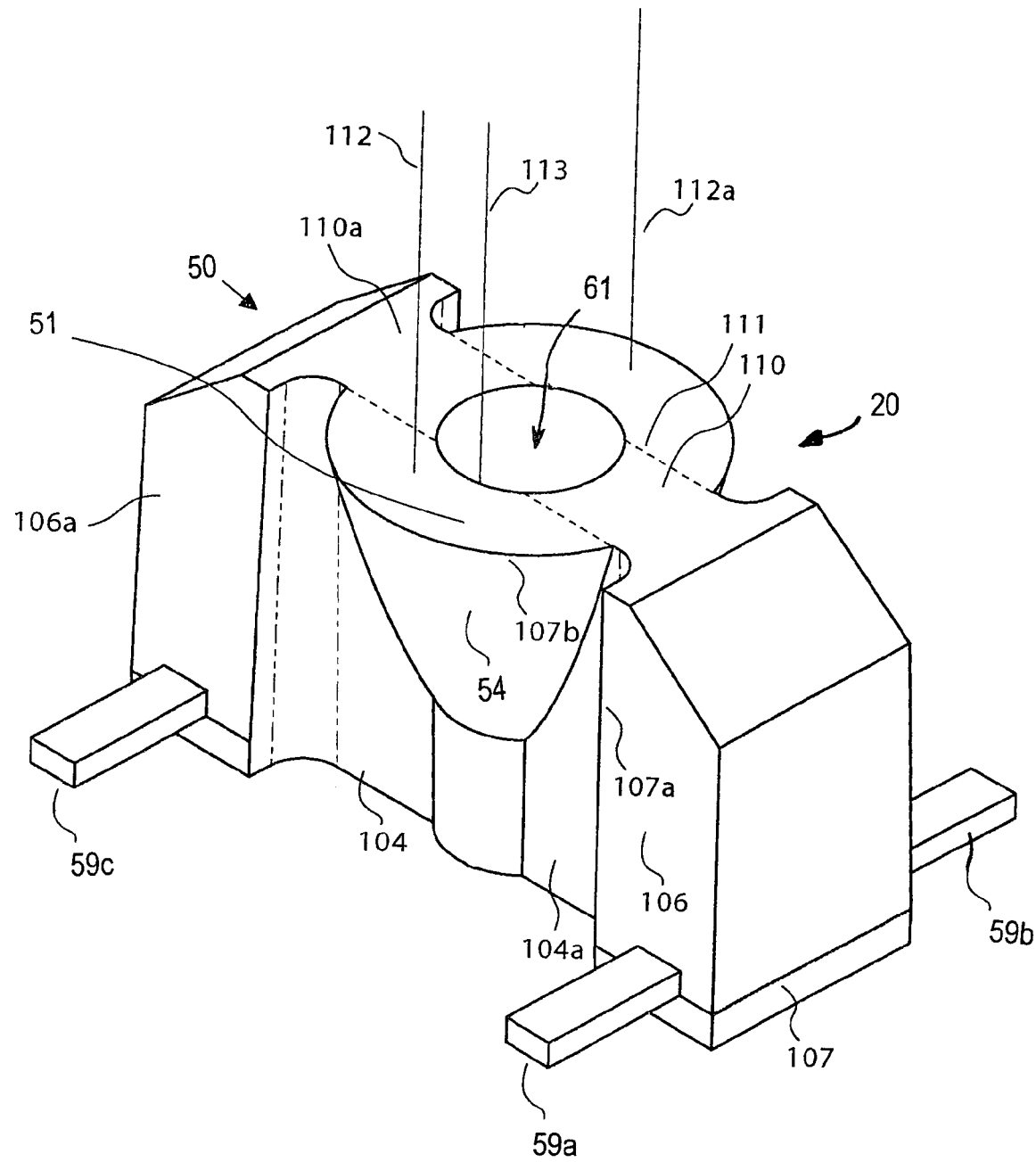
FIG. 1 is a perspective view of a sensor device constructed in accordance with the present invention.

Reference will now be made in detail to the present preferred embodiment of the invention, an example of which is illustrated in the accompanying drawings. Wherever possible, the same reference numerals will be used throughout the drawings to refer to the same or like parts.

Figure 2:
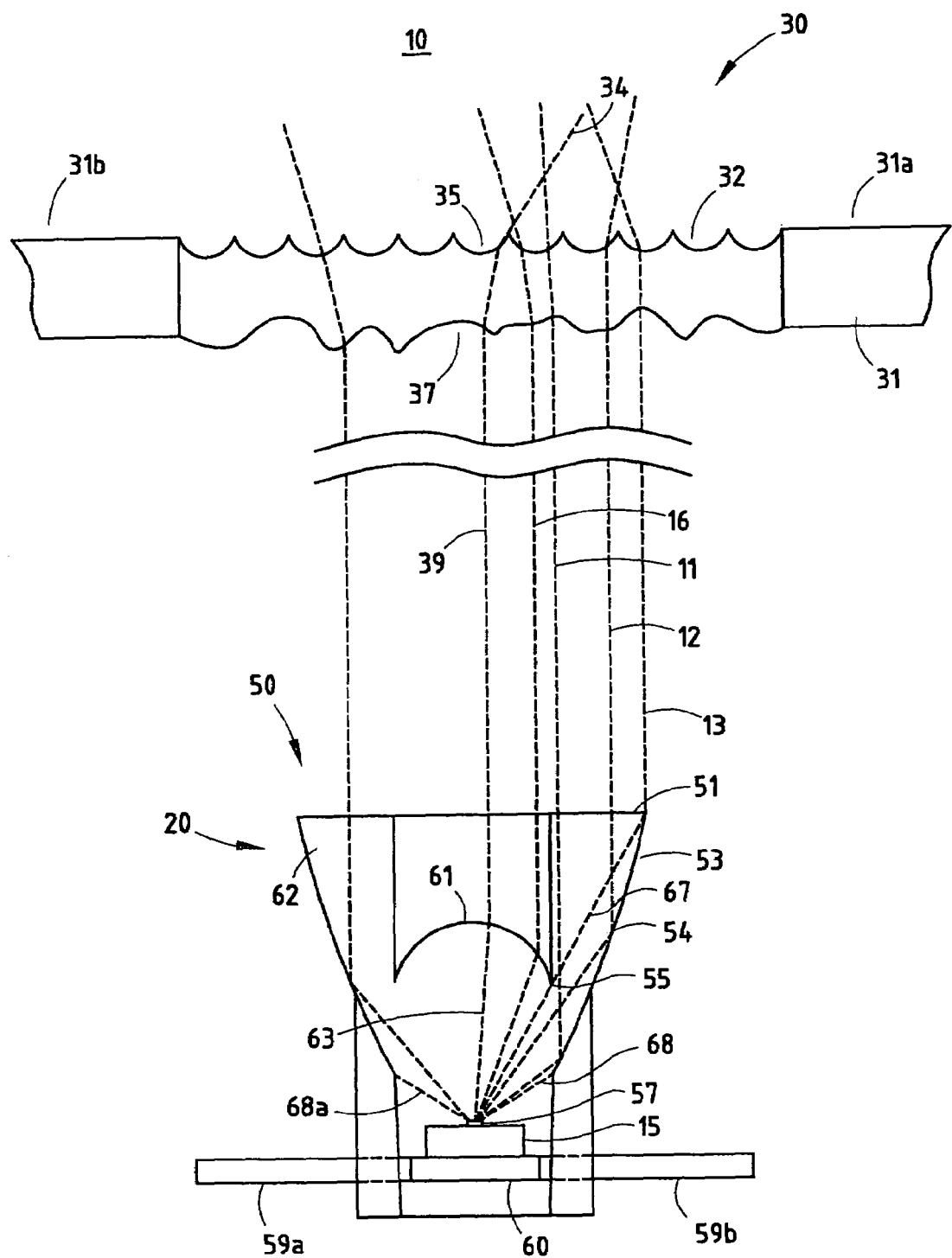
FIG. 2 is a side cross-sectional view of the sensor device shown in FIG. 1 illustrating various light ray tracings that first pass through a diffuser.

A sensor device 50 constructed in accordance with the present invention is shown in FIG. 1 and a sensor assembly 10 incorporating sensor device 50 is shown in FIG. 2. The sensor device 50 includes a support structure, such as a printed circuit board or a lead frame 60, an integrated circuit including a sensing element 15 having an active sensing area 57 mounted on the support substrate for sensing optical radiation, preferably visible light, and an encapsulant 62 encapsulating the sensing element on the support structure. In general, the encapsulant 62 defines a lens structure 20 including an integral refracting lens portion 61 preferably having an elliptical refracting surface for focusing incident optical radiation onto active surface 57 of sensing element 15. Lens structure 20 further includes an optical radiation collector portion 53 surrounding the lens portion 61 for collecting and redirecting optical radiation that is not incident on lens portion 61 onto the active surface 57 of sensing element 15. The optical radiation collecting portion 53 includes a parabolic reflecting surface 54 that redirects incident optical radiation towards sensing element 15 by total internal reflection. Optical radiation collecting portion also includes an annular optical radiation receiving surface 51 that lies in a plane perpendicular to the major axis of elliptical lens portion 61 and is disposed around elliptical lens portion 61.

Sensor assembly 10 further includes a diffuser and aperture subassembly 30 that includes an aperture formed in a housing enclosure 31 and a diffuser 32 disposed in the aperture formed in enclosure 31. Having generally described the structure of the sensor assembly of the present invention, a description of the optical properties, functions, and advantages of such structure is provided below.

Figure 4:
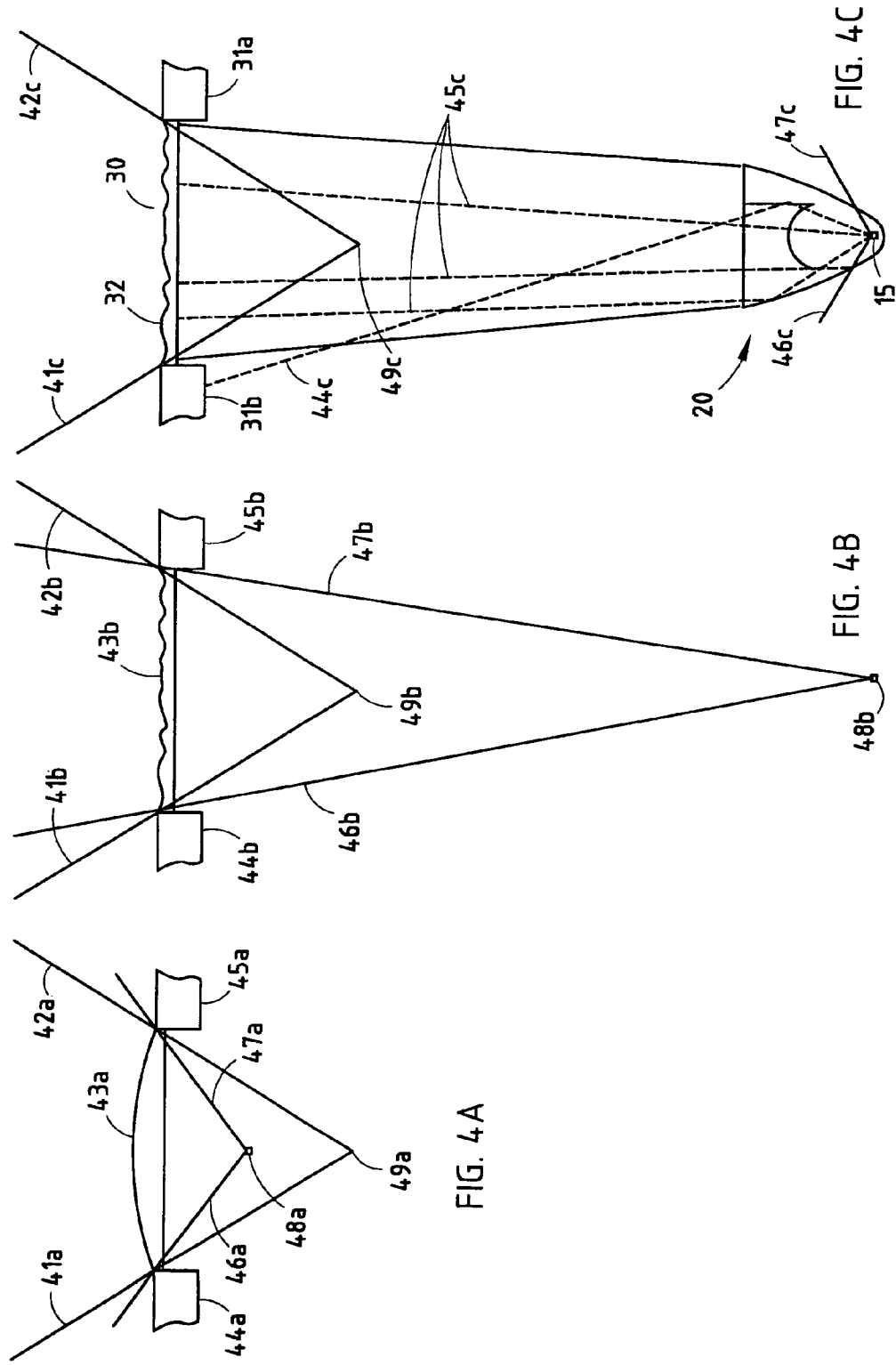
FIG. 4a is a side view of a sensor device disposed close to an aperture in which a lens is disposed.
FIG. 4b is a side view of a sensor device disposed farther from an aperture in which a diffuser is disposed.
FIG. 4c is a side view of a sensor device according to the present invention, which is spaced a substantial distance from an aperture in which a diffuser is disposed.

In the sensor configuration shown in FIG. 4c, a sensor constructed as described above is placed at an appreciable distance from the aperture and has desirably high optical gain. Features which lead to this desirable combination are portions of the invention described herein.

In the illustration in FIG. 4c, the positioning and definition of 49c is similar to that for 49a and 49b (FIGS. 4a and 4b), and the positioning of the small area sensing element 15 is similar to that of 48b. Other corresponding features are also comparable except that a lens structure which preferably encapsulates and preferably surrounds sensor 15 is added and lens and/or diffusing element 32 is designed to generally obtain the desired profile of sensitivity versus angle for the total system. The resulting system gives substantially enhanced optical gain over that in FIG. 4b.

The lens structure 20 functions to project light rays entering through the aperture onto the active area 57 of sensor 15 filling a substantial portion of a relatively large cone angle, the extremes of which are depicted by lines 46c and 47c in the illustrative example. The lens does not need to preserve imaging integrity but in some other respects parallels low F number photographic lens. It is also preferable to have an even lower F number than is normally practical with imaging optics. In the preferred structure, a majority of the rays of which 45c are representative which are focused by the lens structure 20 onto the sensor, originate from the desired field of view and enter the system through the aperture. Preferably rays, such as 44c, which do not enter through the aperture, make up a small to negligible portion of the light which the lens directs to the active area of the sensor 15. In the foregoing, particularly when the angle between 41c and 42c is large, only a sampling of these rays will typically be directed to the active sensing area, but it is preferable that the majority of the rays which are directed to the active sensing area come from the directions for which the light level is to be measured. The lens and/or diffusing unit 32 is designed to have a dispersing effect so that a representative proportion of rays emanating from within the field delimited by the direction of 41c and 42c in the illustrative example are brought to an alignment whereby they are focused by the lens structure 20 onto the active area of sensor 15. It is preferable that both the distribution and the extent of the scattering profile of the diffuser be such that the angle dependent magnitude and the general extremes of the response profile for the optical system meet design objectives. Since increased scattering reduces the overall optical gain, it is also preferable that the degree of scattering be reasonably close to the minimum amount needed to meet the response profile objectives.

In some embodiments of the invention, optical subassembly 30 may include a single negative or even a positive lens element. It is, however, preferable to have finer patterns. The pattern may be, for example, repetitious or random in the diffusing effect and produced by a fine array of small lens elements by a diffusant which is disbursed in the material which covers the aperture by a randomly or irregularly grained surface or even by an ultra fine structure which may be generated by replicating a micro pattern. A micro pattern may be generated by laser interference patterns and such diffusers may in turn employ interference patterns generated by the fine features of the optical surface in addition to or in place of reflective or refractive effects to achieve the desired light disbursing effect.

As shown in FIG. 2, light enters through aperture and diffuser subassembly 30 and after traveling some distance, a portion of the entering rays strike the lens structure 20 of sensor device 50 where a portion of the rays which strike the sensor are directed to the light sensing area 57 on sensing element 15. Leads 59a–59d are electrically attached to the sensing element 15 and to an associated electrical circuit 66 (FIG. 5), which functions to read or otherwise respond to the level of the light which strikes the sensor. The diffuser and aperture subassembly 30 functions to shape the directional or spatial response profile of the sensor so that the profile of sensitivity versus direction is satisfactory for the application. For some embodiments of this invention, the lens structure 20 in sensor device 50 is designed so that it serves to direct a large enough proportion of the rays which emanate from the diffusing element and strike the sensor on the light sensing area of the chip to make the overall optical gain of the system comparable to or in some instances greater than that which is normally attained when the sensor is positioned close to the sensing aperture, i.e. in the near field region. With the sensor positioned in the near field area, it is often readily possible to direct light from the field of view so that it fills a relatively large solid angle as it impinges on the active area of the sensor and thereby contributes to the overall optical gain. In the design of FIG. 2, it is desirable to provide a design which maintains reasonable, perhaps comparable or better optical efficiency throughout a range of positioning options for the sensing element which may in some instances include the near field but which may in others extend to a much greater distance from the aperture than the farthest extent of the near field. One way to practice the invention is to provide a lens system which directs rays which emanate from the diffusing element to the light sensitive element 15 and to generally fill an effective solid angle which is comparable in size to that of the comparable system in the near field with these rays. In the discussion, the active region 57 of the sensor is more sensitive to rays which enter from some directions or positions on the active surface than from others, and the net effect on the output of a ray which strikes the active area of the sensor is equal to the product of the intensity of the ray with the efficiency with which a ray entering at the particular angle and at the particular position on the sensor surface is received by the sensor. This may be referred to as the response efficiency for responding to light to the particular point on the sensor and coming from a particular angle relative to the sensor. The lenses or combination of lenses and diffusing elements may also vary in the efficiency with which they direct rays to particular entrance angles and positions and this may be referred to as the collection efficiency for directing light to the particular point on the sensor and coming from a particular angle relative to the sensor. Thus, for a particular angle and point of entry, a reception efficiency may be defined as the product of the response efficiency and the collection efficiency. It would be most accurate to integrate the reception efficiency over the solid angle through which light enters the active sensing area and to use this integrated reception angle perhaps instead of the solid angle as a basis for comparison of the optical systems. The general point is that it is a desirable feature of the invention to generally fill a large solid angle relative to the sensing element 15 with light and for this solid angle to generally include the regions of high sensitivity of the sensor to incoming light. Since the sensor may have an approximate cosine response characteristic for which the response efficiency is highest for normal rays and for which the response approaches zero for rays which are nearly parallel or tangent to the sensing surface, it is generally preferable to favor directions normal to the sensing surface for the portions of the total solid angle over which incident rays are directed to the sensor. The angle between lines 68 and 68a generally denotes the outer extent of the cone angle over which rays are collected in the illustrative embodiment. As will be discussed later, a rib to encapsulate the lead frame connections prevents filling of some portions of the cone delimited by lines 68 and 68a.

In the illustrative diffuser and aperture assembly 30, fragmentary portions 31a and 31b of the preferably opaque housing enclosure 31 are shown. Surface 35 of diffuser 32 contains generally parallel grooves. These grooves serve to increase the dispersion of light in a direction generally parallel to the sheet of paper. The lower surface 37 of diffuser assembly 30 is an irregular surface which serves to diffuse the light approximately equally in every direction. Ray 34 is refracted at surfaces 35 and 37, and continues as ray 39 through refracting lens 61 which focuses it as ray 63 onto the active sensing surface 57. Ray 16 is likewise refracted by lens 61 and focused onto the active area 57. Ray 16 is closer than ray 39 to the outer extent 55 of the refracting lens 61. Rays 11, 12, and 13 enter the upper surface of lens structure 20 and are reflected by total internal reflection at reflecting surface 54 striking the active sensing area 57. The order of the reflected rays is reversed from the order of the incoming rays. The lens 61 is set at a depth such that the outer reflected ray 67 just misses the edge 55. In the lens structure 20, the refracting portion 61 fills in the center portion of the cone of rays which is directed toward active sensing area 57. The parabolic reflecting surface 54 fills in the outer proportion of the cone. The combined reflecting and refracting lenses complement each other to generally fill the area between lines 68 and 68a. The resulting dispersion is greater in the direction parallel to the paper due to the combined and generally additive effects of the unidirectional dispersion of surface 35 and the multi-directional dispersion of surface 37. The result is a sensor with a substantially wider field of view in the direction parallel to the paper than in the direction perpendicular to the paper.

The integrated sensing element circuit 15, of which the active sensing area 57 is a part, is attached to lead frame 60. The active sensing area 57 may be small, for example, 100 microns in diameter. The sensing area is shown as a raised portion in the illustration only to make it stand out. In the actual part, it is likely to be flush or even very slightly recessed. The attachment of sensor circuit 15 to lead frame 60 may be made using conductive epoxy completing one of the electrical connections with the other connections completed by lead bonds or, alternately, all of the connections may be made with lead bonds. Leads 59a–59d extend from the package to make electrical connection to the printed circuit board and to attach the part to the printed circuit board.

FIG. 1 is an isometric drawing of the sensor device 50. Representative ray 112 enters the top surface 51 and is reflected by total internal reflection at surface 54 to the active sensing area 57 of the sensor element 15. Likewise, ray 112a is reflected by a similar surface at the back of the device and also strikes the active sensing area. Ray 113 enters through the recessed refracting lens 61 and is focused to the active sensing area. Rib portion 104 serves to house the lead frame and allow clearance for the mold to be retracted from the part. Section 106 is one of two sections of the rib which is widened to provide support for the leads 59a and 59b. Leads 59c and 59d extend from the symmetrically placed enlarged section 106a. The dashed lines 111 are included for illustrated purposes to delimit areas 110 and 110a. The areas are above the ribs 104 and 104a which join with the parabolic reflector 54. Rays entering this area are not generally directed to the active sensing area. The part is preferably made in a two-part mold which has parting lines generally depicted by representative lines 107, 107a, and 107b.

Figure 3:
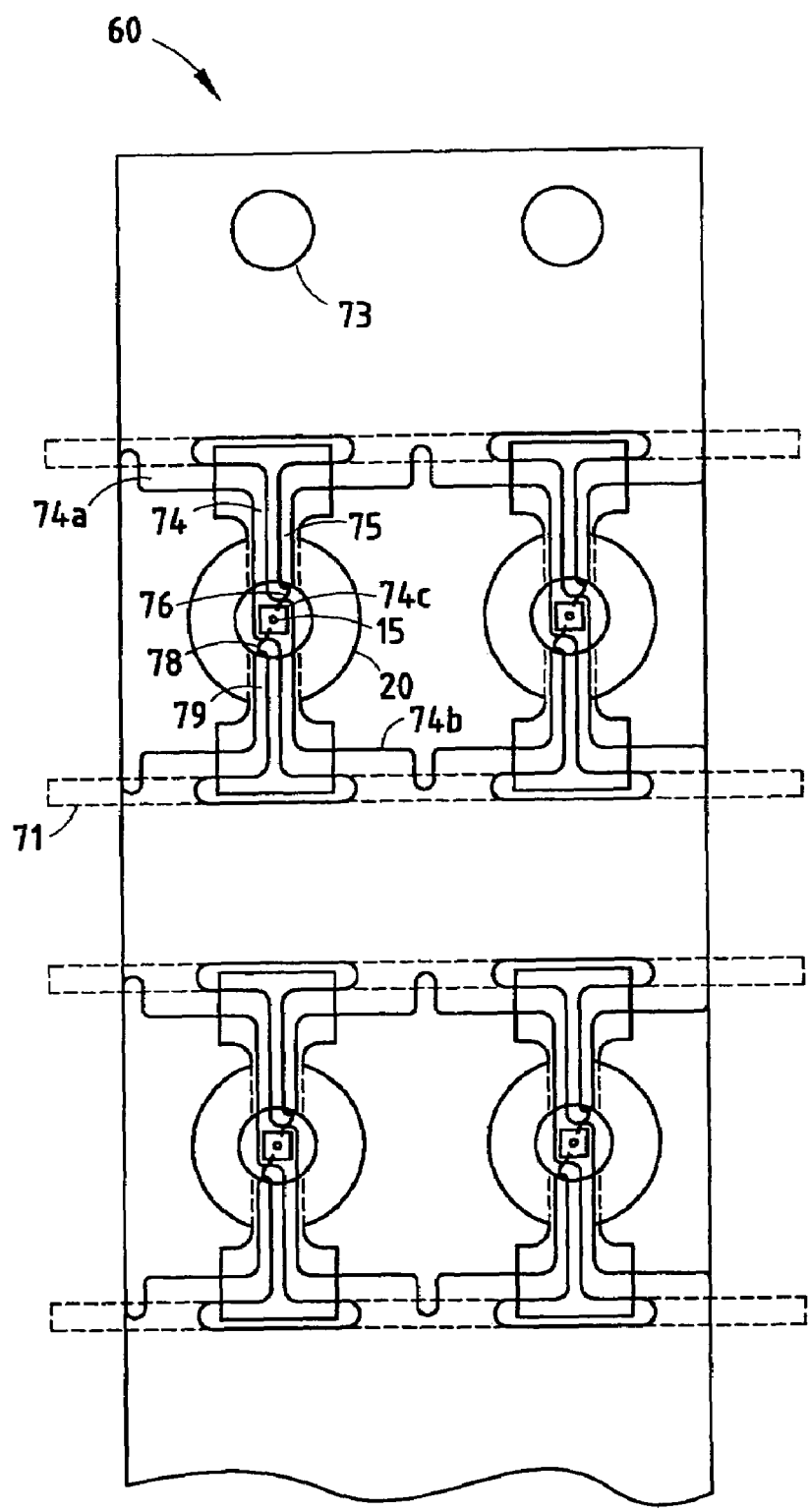
FIG. 3 is a top plan view of a lead frame component used to construct several sensor devices in accordance with the present invention.

FIG. 3 illustrates a portion of a lead frame subassembly 60 on which integrated sensor element circuit 15 has been bonded. Only four of the devices have been shown. The actual assembly would include the number of devices, perhaps 64, which would fit in one of the transfer mold sections. The lead frame assembly includes holes, of which 73 is representative, which are used for locating and holding the lead frame during the assembly processes. Element 74 of the lead frame subassembly provides two connecting pins 74a and 74b and a pad 74c on which the silicon sensor element circuit 15 is mounted. The element 74 also serves as the cross-connecting link to hold the lead frame assembly together prior to separation of the parts. The dashed rectangles of which 71 is representative denote the areas that are punched out in order to separate the parts after the molding process is complete. Lead bond wires 76 and 78 connect bonding pads on the silicon sensor circuit 15 to connecting pins 75 and 79, respectively. Upon separation of the devices, pins 74a and 74b serve as leads 59c and 59b, respectively, while pins 75 and 79 serve as leads 59d and 59a, respectively. The circular element 20 depicts the outline feature of the plastic lens which will be molded over the part. After the light sensing dies are bonded to the lead frame and connections are made, the lead frame is placed in a transfer mold and the plastic lens assembly depicted in FIGS. 1, 2, and 4*c* is transfer molded onto the lead frame. The lens has the advantage of being in one piece and serving to encapsulate the part. It may also be molded with a conventional two-part mold. After the parts are molded, they are cut apart and de-flashed to form individual parts as depicted in FIG. 1.

In the preferred configuration, the lens system is designed to focus light entering from a narrow beam angle which is approximately parallel to the axis of the lens system onto the active sensing area. For this system, the reflecting portion is a parabola whose focus is approximately centered on the light sensitive area of the receiver. The refracting lens is preferably elliptical in shape, being designed to focus light rays which are parallel to the axis of the system onto the center of the light sensitive area. An elliptical shaped lens having its major axis coincident with the axis of the lens system, having the foci which is most distant from the tip of the lens coincident with the center of the light sensing area, and having a ratio of major diameter to minor diameter chosen to give the best focus for light of a color for which the system is optimized is a design choice which will serve this purpose well. The focal length of the parabola is chosen so that rays parallel to the axis of the lens which strike the active portion of the parabola at points which are closest to the center axis of the lens are reflected at an angle which fills in the outer extent of the cone of light which the optical system is designed to focus onto the sensor. When the location of the focus of the ellipse and the alignment of the major axis and the ratio of the major diameter to the minor diameter are chosen as outlined above, one is still free to scale the overall size of the ellipse. It is preferable to scale the size of the ellipse so that the outer edge of the elliptical lens is just high enough in the lens structure to clear rays which are reflected to the sensing surface from the outermost extent of the parabolic surface. As the diameter of the refracting lens is increased, the slope at its outer extent becomes too high. Stated another way, there is a maximum practical cone angle which can be filled by a single surface lens made of a material of a given refractive index. This is the major factor which influences the choice of the balance between the diameter of the refracting lens and the diameter of the parabolic reflector. The overall size of the lens assembly may be scaled. It should not be so small that tolerances are unnecessarily tight and also needs to be large enough that the encapsulated sensor assembly will fit under the refracting lens. Also, the parabolic reflector needs to be large enough that the area taken from the reflector by the rib which encapsulates the connecting leads is not an undesirably large proportion of the total reflector area. Example dimensions are as follows: the semi-major diameter of elliptical lens 61 is 1.529 mm and the semi-minor diameter of elliptical lens 61 is 1.163 mm; the focal length of parabolic reflector 54 is 0.2887 mm; the radius of refracting lens 61 is 1.0 mm; the radius of parabolic reflector 54 at top is 2.2 mm; and the index of refraction of the plastic encapsulant 62 is 1.54.

The encapsulant 62 may be made of single material or may be made of more than one material as disclosed in commonly assigned U.S. patent application Ser. No. 10/043,977 filed on Jan. 10, 2002, by Jon H. Bechtel et al. entitled "SENSOR DEVICE HAVING AN ANAMORPHIC LENS," the disclosure of which is incorporated herein by reference in its entirety.

The sensing element 15 may be any form of photosensor device such as a photodiode, cadmium sulfide CdS cell, etc. A preferred sensing element is the photodiode disclosed in commonly assigned U.S. patent application Ser. No. 09/491,192 filed on Jan. 25, 2000, by Jon H. Bechtel et al. entitled "VEHICLE EQUIPMENT CONTROL WITH SEMICONDUCTOR LIGHT SENSOR," and U.S. patent application Ser. No. 09/307,191 filed on May 7, 1999, by Robert H. Nixon et al. entitled "PHOTODIODE LIGHT SENSOR," the entire disclosures of which are incorporated herein by reference. A brief disclosure of the structural components of the sensing element circuitry and of a processing circuit 66 that interfaces with sensing element 15 is discussed below with reference to FIGS. 5–9.

Figure 5:
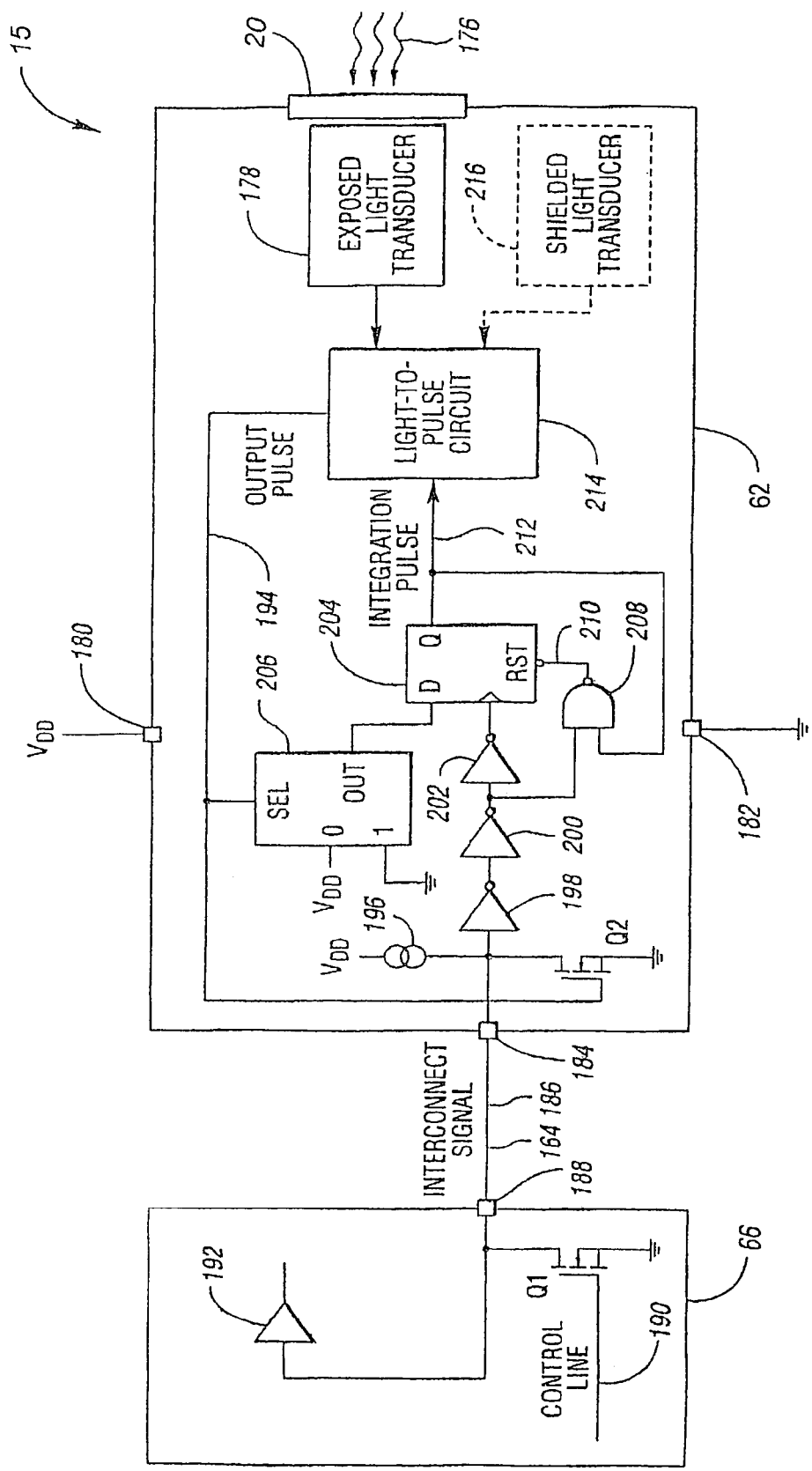
FIG. 5 is an electrical circuit diagram in block and schematic form showing circuitry permitting a processing circuit and a sensing element, which may be used in the inventive sensor device structure to be interconnected by a single line carrying both sensitivity control and sensor output.

Referring now to FIG. 5, the processing circuit 66 and sensing element 15 will be described in greater detail. The processing circuit 66 and sensor element 15 are interconnected by a single line 164 that carries interconnect signals 186, which can advantageously include both light sensor sensitivity control signals and resultant light sensor output signals. A microcontroller may be used to implement processing circuit 66 and would include a transistor element Q1 and a buffer 192 connected to an output pin 188, or other input/output (I/O) pin structure, which is connected to signal line 164. The transistor element Q1 may be implemented using a suitable transistor such as a field effect transistor (FET) connected between signal pin 188 and ground. Transistor Q1 is controlled by control line 190, which is connected to the base of transistor Q1. Buffer 192 is also connected to signal pin 188 to isolate the signal line 164 from signal levels present in the microcontroller.

As described above, the sensor device includes an encapsulant 62 including a lens 61 for admitting light 176 incident on an exposed light transducer 178. Encapsulant 62 also admits and retains power pin 180, ground pin 182, and signal pin 184, which are preferably part of lead frame 12. The use of only three pins 180, 182, and 184 greatly reduces the cost of sensing element 15 and associated processing circuit 66.

Sensing element 15 is connected to processing circuit 66 through bus 164, which carries interconnection signal 186 between signal pin 184 in sensing element 15 and signal pin 188 in processing circuit 66. As will be described below, signal pins 184, 188 are tri-state ports permitting interconnect signal 186 to provide both an input to sensing element 15 and an output from sensing element 15.

Within sensing element 15, transistor Q2, which can be implemented using a suitable transistor such as an FET element, is connected between signal pin 184 and ground. Transistor Q2 is controlled by output pulse 194 connected to the gate of Q2. Constant current source 196 is connected to signal pin 184 so that if neither transistor Q1 nor transistor Q2 are ON (high logic level), interconnect signal 186 is pulled to a high logic level. Constant current source 196 nominally sources about 0.5 mA to pull up interconnect signal 186. The input of Schmidt trigger inverter 198 is connected to signal pin 184. Inverters 200 and 202, which are connected in series, follow Schmidt trigger inverter 198. The output of inverter 202 clocks D flip-flop 204. The output of multiplexer 206 is connected to the D input of flip-flop 204. The select input of multiplexer 206 is driven by output pulse 194 such that when output pulse 194 is asserted, the D input of flip-flop 204 is unasserted, and when output pulse 194 is not asserted, the D input of flip-flop 204 is asserted. The output of NAND gate 208 is connected to low asserting reset 210 of flip-flop 204. The output of flip-flop 204 is integration pulse 212. Integration pulse 212 and the output of inverter 200 are inputs to NAND gate 208. Light-to-pulse circuit 214 accepts integration pulse 212 and the output of exposed light transducer 178 and produces output pulse 194.

Sensing element 15 may advantageously include a shielded light transducer 216, which does not receive light 176. Shielded light transducer 216 has substantially the same construction as exposed light transducer 178, being of the same size and material as transducer 178. Light-to-pulse circuit 214 uses the output of shielded light transducer 216 to reduce the affects of noise in exposed light transducer 178.

Figure 6:
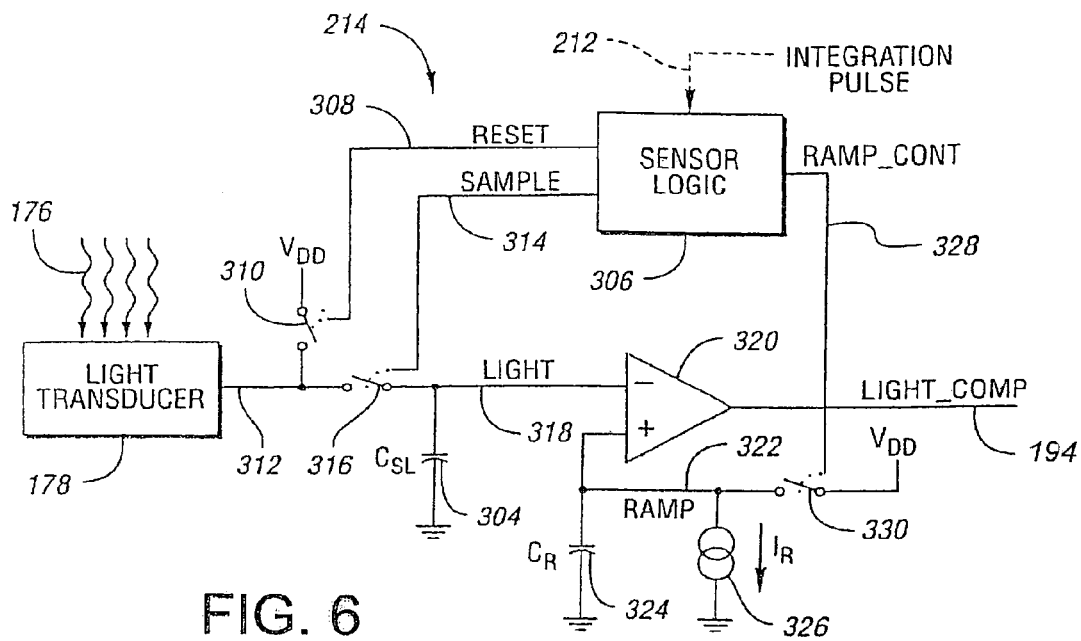
FIG. 6 is a schematic diagram of a light-to-pulse circuit for use in the sensing element shown in FIG. 5.

FIG. 6 is a schematic diagram illustrating the light-to-pulse circuit 214, which includes exposed light transducer 178 for converting light 176 incident on exposed light transducer 178 into charge accumulated in light storage capacitor 304, indicated by $C_{SL}$. Exposed light transducer 178 may be any device capable of converting light 176 into charge, such as the photogate sensor described in U.S. Pat. No. 5,471,515 entitled "ACTIVE PIXEL SENSOR WITH INTRA-PIXEL CHARGE TRANSFER" to E. Fossum et al. Preferably, light transducer 178 is a photodiode such as is described below. Except as noted, the following discussion does not depend on a particular type or construction for exposed light transducer 178.

Light-to-pulse circuit 214, which is connected to transducer 178, receives an integration pulse 212, and outputs a light comparator signal which is proportional to the amount of light 176 impacting transducer 178 during integration period pulse 212. Light-to-pulse circuit 214 operates under the control of sensor logic 306. Sensor logic 306 generates reset signal 308 controlling switch 310 connected between exposed light transducer output 312 and $V_{DD}$. Sensor logic 306 also produces sample signal 314 controlling switch 316 between exposed light transducer output 312 and light storage capacitor 304. The voltage across light storage capacitor 304, light storage capacitor voltage 318, is fed into one input of comparator 320. The other input of comparator 320 is ramp voltage 322 across ramp capacitor 324. Ramp capacitor 324 is in parallel with current source 326 generating current $I_R$. Sensor logic 306 further produces ramp control signal 328 controlling switch 330 connected between ramp voltage 322 and $V_{DD}$. Comparator 320 produces comparator output 194 based on the relative levels of light storage capacitor voltage 318 and ramp voltage 322. Sensor logic 306 may generate reset signal 308, sample signal 314, and ramp control signal 330 based on internally generated timing or on externally generated integration pulse 212.

Figure 7:
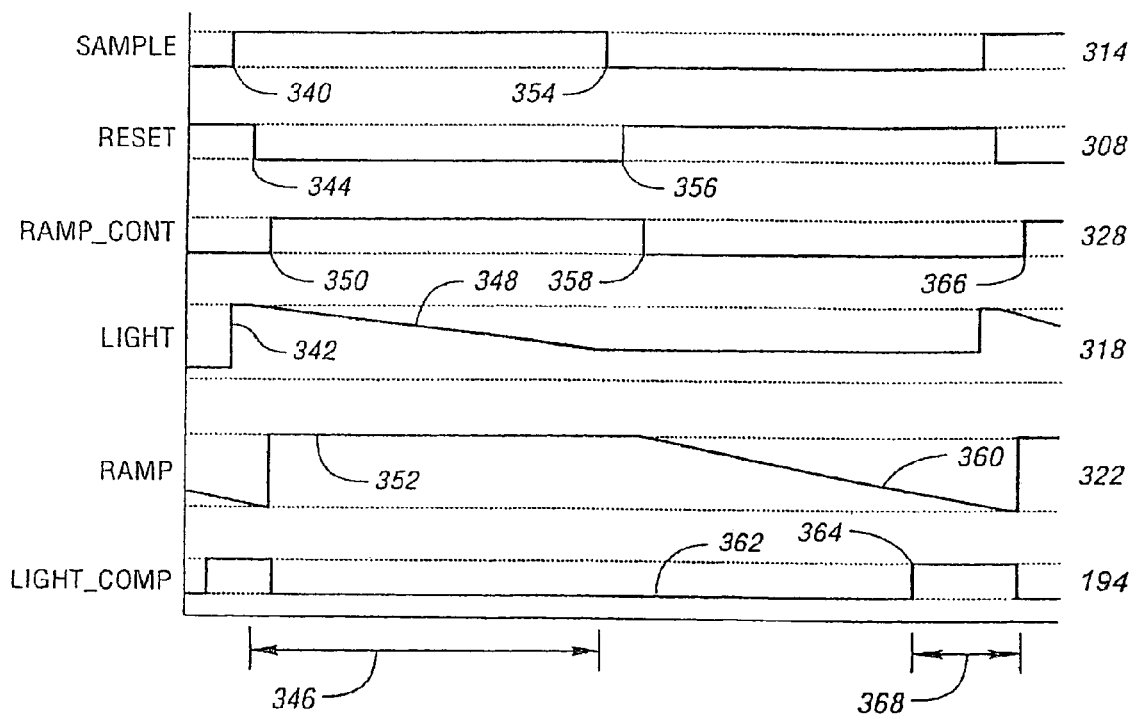
FIG. 7 is a timing diagram illustrating operation of the light-to-pulse circuit of FIG. 6.

Referring now to FIG. 7, a timing diagram illustrating operation of the light-to-pulse circuit 214 of FIG. 6 is shown. A measurement cycle is started at time 340 when sample signal 314 is asserted while reset signal 308 is asserted. This closes switch 316 to charge light storage capacitor 304 to $V_{DD}$ as indicated by voltage level 342 in light storage capacitor voltage 318. Reset signal 308 is then deasserted at time 344, opening switch 310 and beginning integration period 346. During integration period 346, light 176 incident on exposed light transducer 178 generates negative charge causing declining voltage 348 in light storage capacitor voltage 318. At time 350, ramp control signal 328 is asserted closing switch 330 and charging ramp capacitor 324 so that ramp voltage 322 is $V_{DD}$ as indicated by voltage level 352.

Sample signal 314 is deasserted at time 354, causing switch 316 to open, thereby ending integration period 346. At some time 356 following time 354 and prior to the next measurement cycle, reset signal 308 must be asserted closing switch 310. At time 358, ramp control signal 328 is deasserted opening switch 330. This causes ramp capacitor 324 to discharge at a constant rate through current source 326 as indicated by declining voltage 360 in ramp voltage 322. Initially, as indicated by voltage level 362, comparator output 332 is unasserted because ramp voltage 194 is greater than light storage capacitor voltage 318. At time 364, declining voltage 360 in ramp voltage 322 drops below light storage capacitor voltage 318 causing comparator output 194 to become asserted. Comparator output 194 remains asserted until time 366 when ramp control signal 328 is asserted closing switch 330 and pulling ramp voltage 322 to $V_{DD}$. The difference between time 366 and time 364, indicated by pulse duration 368, is inversely related to the amount of light 176 received by exposed light transducer 178 during integration period 346. The integration period 346 can be set directly by the integration pulse 212 or a signal derived from integration pulse 212. It is envisioned that the integration period 346 will be proportional to the width of the integration pulse 212, which is proportional to the pulse width of the control line signal 190 in the circuit of FIG. 5.

Figure 8:
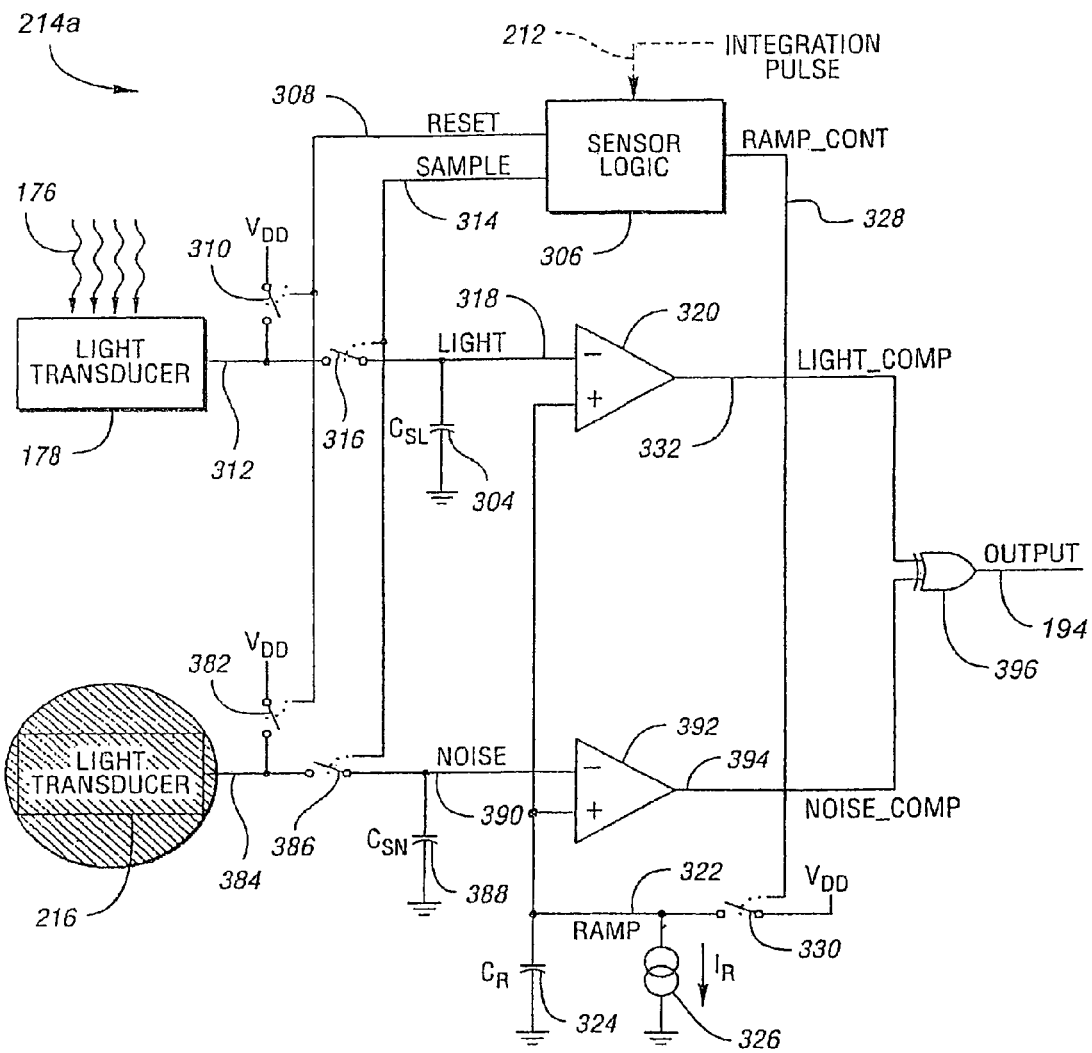
FIG. 8 is a schematic diagram of an optional light-to-pulse circuit with noise compensation for use in the sensing element shown in FIG. 5.

FIG. 8 is a schematic diagram of a modified light-to-pulse circuit 214a with noise compensation. Modified light-to-pulse circuit 214a improves upon light-to-pulse circuit 214 by incorporating shielded light transducer 216 and associated electronics. Shielded light transducer 216 preferably has the same construction as exposed light transducer 178. However, shielded light transducer 216 does not receive light 176. Charge generated by shielded light transducer 216, therefore, is only a function of noise. This noise is predominately thermal in nature. By providing shielded light transducer 216 having the same construction as exposed light transducer 178, such that the exposed and shielded transducers have the same surface area and material composition and may be deposited on the same die, the noise signal produced by shielded light transducer 216 will closely approximate the noise within the signal produced by exposed light transducer 178. By subtracting the signal produced by shielded light transducer 216 from the signal produced by exposed light transducer 178, the effect of noise in light transducer 178 can be greatly reduced.

Reset signal 308 controls switch 382 connected between shielded transducer output 384 and $V_{DD}$. Sample signal 314 controls switch 386 connected between shielded transducer output 384 and noise storage capacitor 388 indicated by $C_{SN}$. The noise storage capacitor voltage 390, which is the voltage across noise storage capacitor 388, is one input to comparator 392. The second input to comparator 392 is ramp voltage 322. The outputs of comparator 392, noise comparator output 394, and comparator output 194 serve as inputs to exclusive-OR gate 396. Exclusive-OR gate 396 generates exclusive-OR output 194 indicating the intensity of light 176.

Figure 9:
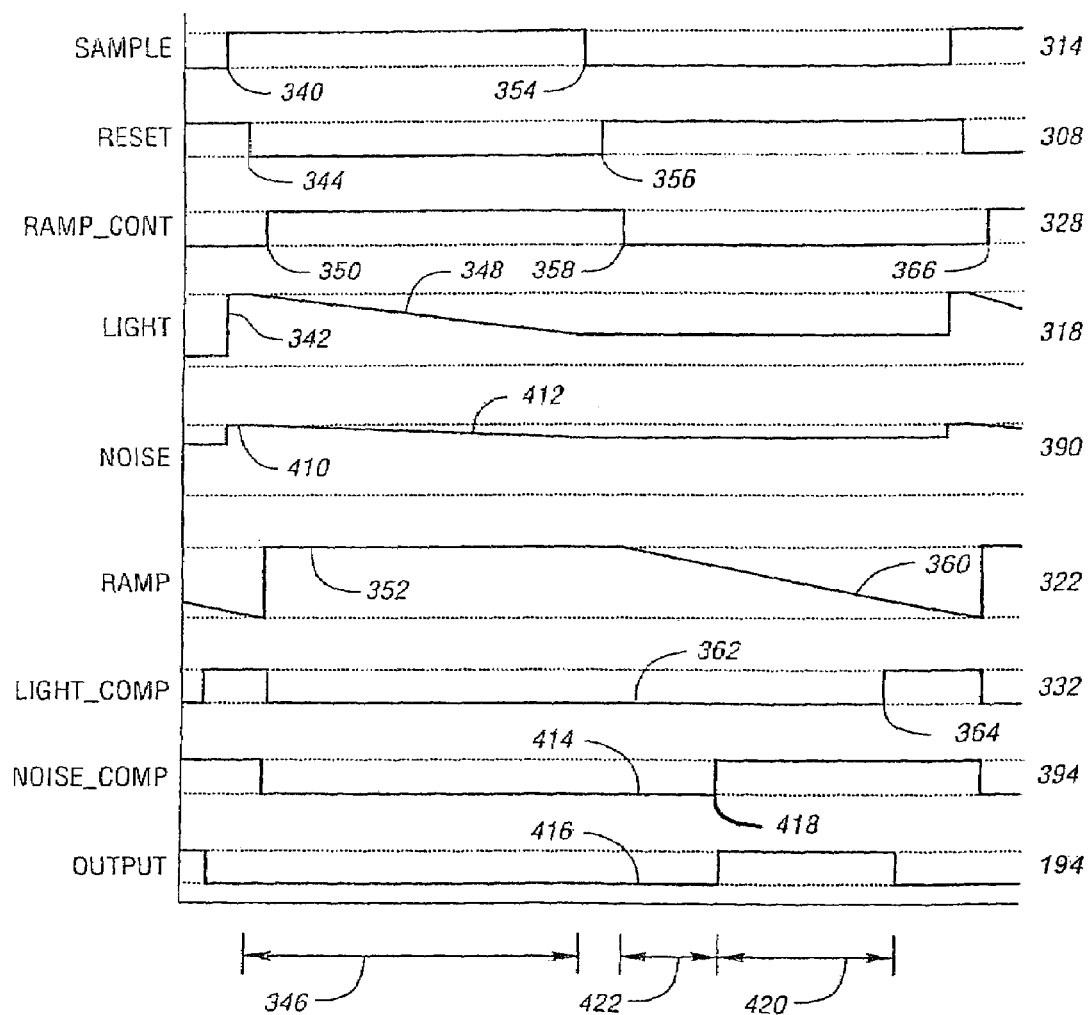
FIG. 9 is a timing diagram illustrating operation of the light-to-pulse circuit of FIG. 8.

FIG. 9 shows a timing diagram illustrating operation of the light-to-pulse circuit 214a of FIG. 8. Light-to-pulse circuit 214a functions in the same manner as light-to-pulse circuit 214 with regard to reset signal 308, sample signal 314, light storage capacitor voltage 318, ramp voltage 322, ramp control signal 328, and comparator output 194. At time 340, sample signal 314 is asserted while reset signal 308 is asserted. Switches 382 and 386 are both closed charging noise storage capacitor 388 to $V_{DD}$ as indicated by voltage level 410 in noise storage capacitor voltage 390. At time 344, reset signal 308 is deasserted opening switch 382 and causing declining voltage 412 in noise storage capacitor voltage 390 from charge produced by shielded light transducer 216 due to noise. At time 354, sample signal 314 is deasserted ending integration period 346 for noise collection. At time 358, ramp control signal 328 is deasserted causing declining voltage 360 in ramp voltage 322. Initially, as indicated by voltage level 414, noise comparator output 394 is unasserted because ramp voltage 322 is greater than noise storage capacitor voltage 390. Since comparator output 332 is also unasserted, output 194 from comparator 396 is unasserted as indicated by voltage level 416. At time 418, ramp voltage 322 drops below the level of noise storage capacitor voltage 390, causing noise comparator output 394 to become asserted. Since noise comparator output 394 and comparator output 332 are different, output 194 from comparator 396 is asserted. At time 364, ramp voltage 322 drops beneath the level of light storage capacitor voltage 318, causing comparator output 194 to become asserted. Since both noise comparator output 394 and comparator output 194 are now asserted, output 194 from exclusive-OR gate 396 now becomes unasserted. The difference between time 364 and time 418, output pulse duration 420, has a time period proportional to the intensity of light 176 incident on exposed light transducer 178 less noise produced by shielded light transducer 216 over integration period 346. The duration between time 418 and time 358, noise duration 422, is directly proportional to the amount of noise developed by shielded light transducer 216 over integration period 346. Since the majority of this noise is thermal noise, noise duration 422 is indicative of the temperature of shielded light transducer 216. At time 366, ramp control signal 328 is asserted, deasserting both noise comparator output 394 and comparator output 194.

In circuits where very high light levels may impinge on the sensor, it is preferable to include a comparator (not shown) to end the output pulse when the voltage 318 falls below a predetermined threshold. This has the effect of limiting the maximum duration 420 of the output pulse at signal 194.

Additional details of the operation of processing circuit 66, sensing element 15, and light-to-pulse circuits 214 and 214a are disclosed in the above referenced U.S. patent application Ser. Nos. 09/491,192 and 09/307,191.

Although a specific and preferred example of a sensing element is disclosed above, the term "sensing element" as used herein is not limited to any such structure, but rather may include a form of photosensor. Similarly, although the "support structure" is described above as being a lead frame or portion thereof, the support structure may be any structure on which a sensing element may be supported and encapsulated.

The sensor device of the present invention may be used in many of the applications in which conventional sensor devices are employed. Commonly assigned U.S. patent application Ser. No. 09/491,192 discloses various automotive applications of such sensors, the entire disclosure of which is incorporated herein by reference.

Figure 10A:
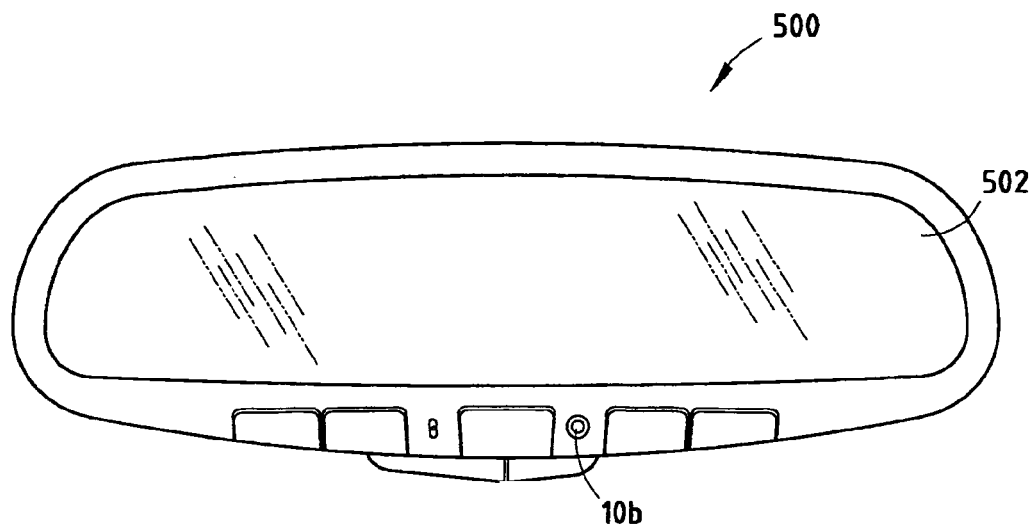
FIG. 10A is an elevational view of the front of a rearview mirror assembly incorporating the sensor device of the present invention.

FIGS. 10A–10D, 11, and 12 show several such automotive applications. Specifically, a rearview mirror assembly 500 is shown in FIGS. 10A–10D, which incorporates an electrochromic rearview mirror 502 that has a reflectivity that is controlled by a processing circuit 66 (FIGS. 5 and 11) as a function of an ambient light level sensed by a forward facing ambient sensor 10a (FIG. 10B) and a rearward facing glare sensor 10b (FIG. 10A). Either one or both of sensors 10a and 10b may have any of the constructions shown in FIGS. 1–4. By utilizing a sensor having the construction shown in either of FIGS. 1–4, the horizontal field of view may be widened or narrowed relative to the vertical field of view as may be desirable for the particular sensor.

Figure 10B:
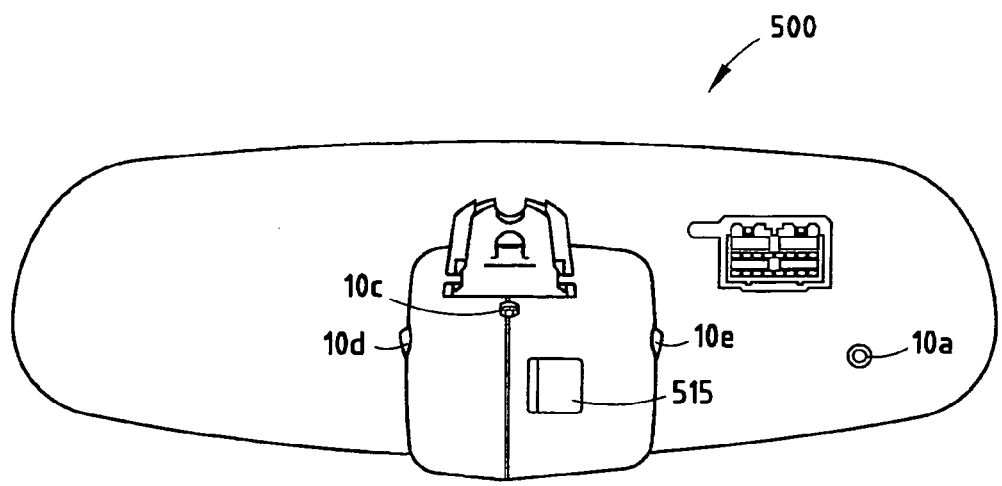
FIG. 10B is an elevational view of the rear of a rearview mirror assembly incorporating the sensor device of the present invention.
Figure 10C:
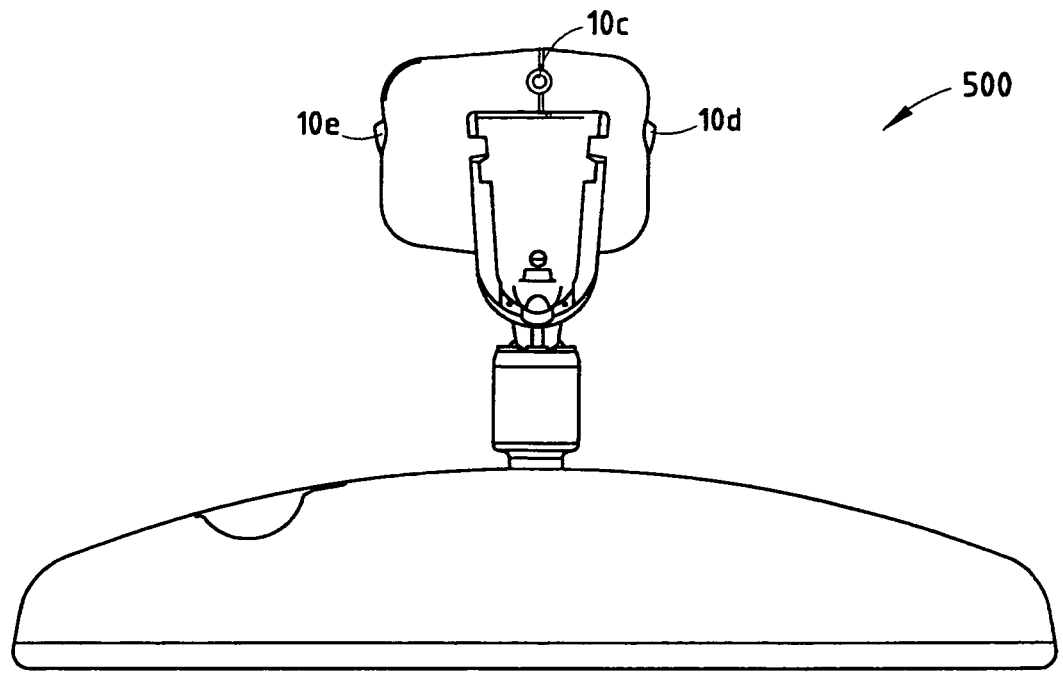
FIG. 10C is a top plan view of the rear of a rearview mirror assembly incorporating the sensor device of the present invention.
Figure 10D:
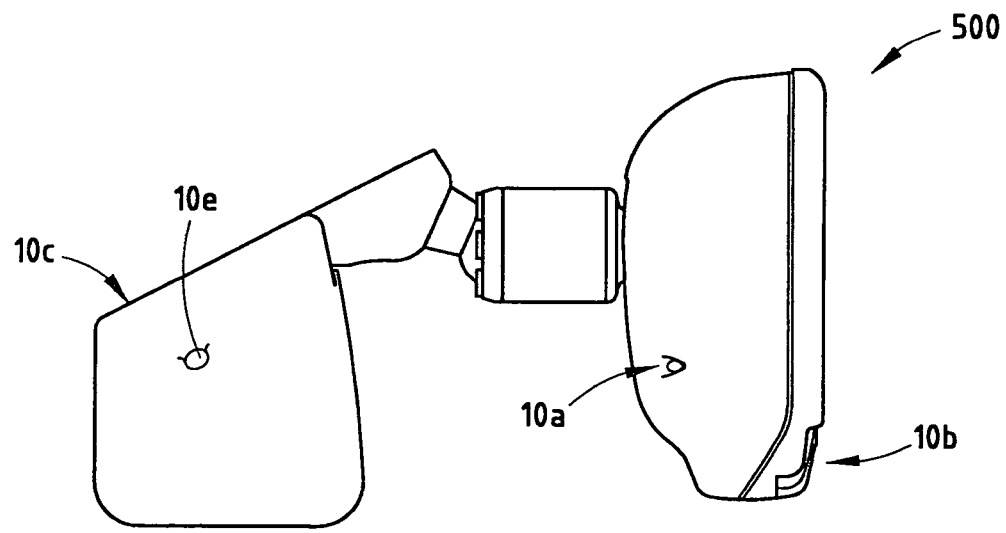
FIG. 10D is an elevational view of the side of a rearview mirror assembly incorporating the sensor device of the present invention.
Figure 11:
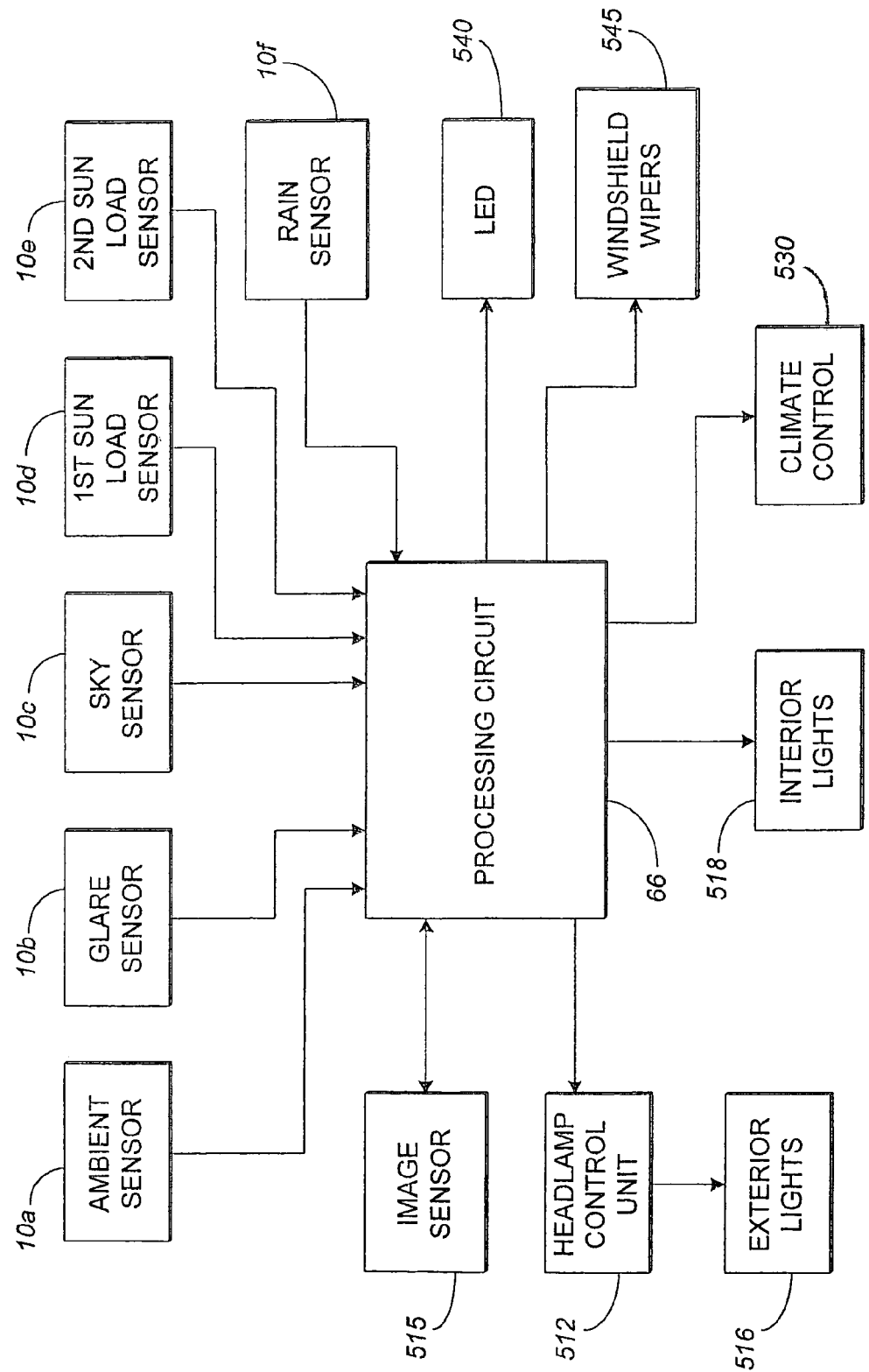
FIG. 11 is an electrical circuit diagram in block form illustrating a vehicle equipment control system employing the sensor device of the present invention.

As shown in FIGS. 10B–10D, the rearview mirror may further include a sky sensor 10c that is aimed upward at the sky. Such a sky sensor is useful in a headlamp control system for detecting tunnels and thereby ensures that headlamps are appropriately turned on when the vehicle is in a tunnel and turned off upon exiting the tunnel. Sky sensor 10c may also advantageously employ the construction shown in FIG. 1 and described above. Sky sensor 10c is coupled to a processing circuit 66 (FIGS. 5 and 11) which, in turn, may be coupled to a headlamp control unit 512 to thereby turn the vehicle headlamps on and off in response to the ambient light level and sky light level sensed by sensors 10a and 10c. The headlamp control system may further include an image sensor 515 for sensing images forward of the vehicle for purposes of controlling the brightness of the high beam headlamps and/or activating or aiming the headlamps or other exterior lights 516 to change the beam pattern produced by the exterior lights based upon light sources detected by the image sensor 515. An example of such a headlamp control system is disclosed in commonly assigned U.S. patent application Ser. No. 09/800,460 filed on Mar. 5, 2001, entitled "SYSTEM FOR CONTROLLING EXTERIOR VEHICLE LIGHTS" filed by Joseph S. Stam et al., the entire disclosure of which is incorporated herein by reference. The output of the sensors 10a, 10b, and/or 10c may also be used to control other vehicle lights such as the interior lights 518 of the vehicle and more particularly to control the brightness of the display lights of the various displays in the instrument panel and other vehicle accessories.

As also shown in FIGS. 10B–10D, two or more additional sensors 10d and 10e may be employed to sense sun loading. Sun loading sensors 10d and 10e are aimed upward toward the sky above the vehicle and are aimed slightly to different sides of the vehicle to sense whether the sun load on one side of the vehicle is greater than on the other side of the vehicle. A processing circuit 66 (FIGS. 5 and 11) is coupled to sun load sensors 10d and 10e and is coupled to a climate control system 530 of the vehicle for adjusting the fan speeds and/or temperature settings for respective sides of the vehicle based upon the light levels sensed by the sun load sensors 10d and 10e. Sun load sensors 10d and 10e may also be configured as described above and shown in FIGS. 1–4. The light levels sensed by any one of the above sensors may be used to control some aspect of the operation of climate control system 530. For example, sky sensor 10c and ambient sensor 10a may be used to detect an approaching tunnel to thereby cause the headlamps to turn on and the climate control to enter a recirculation mode.

Figure 12:
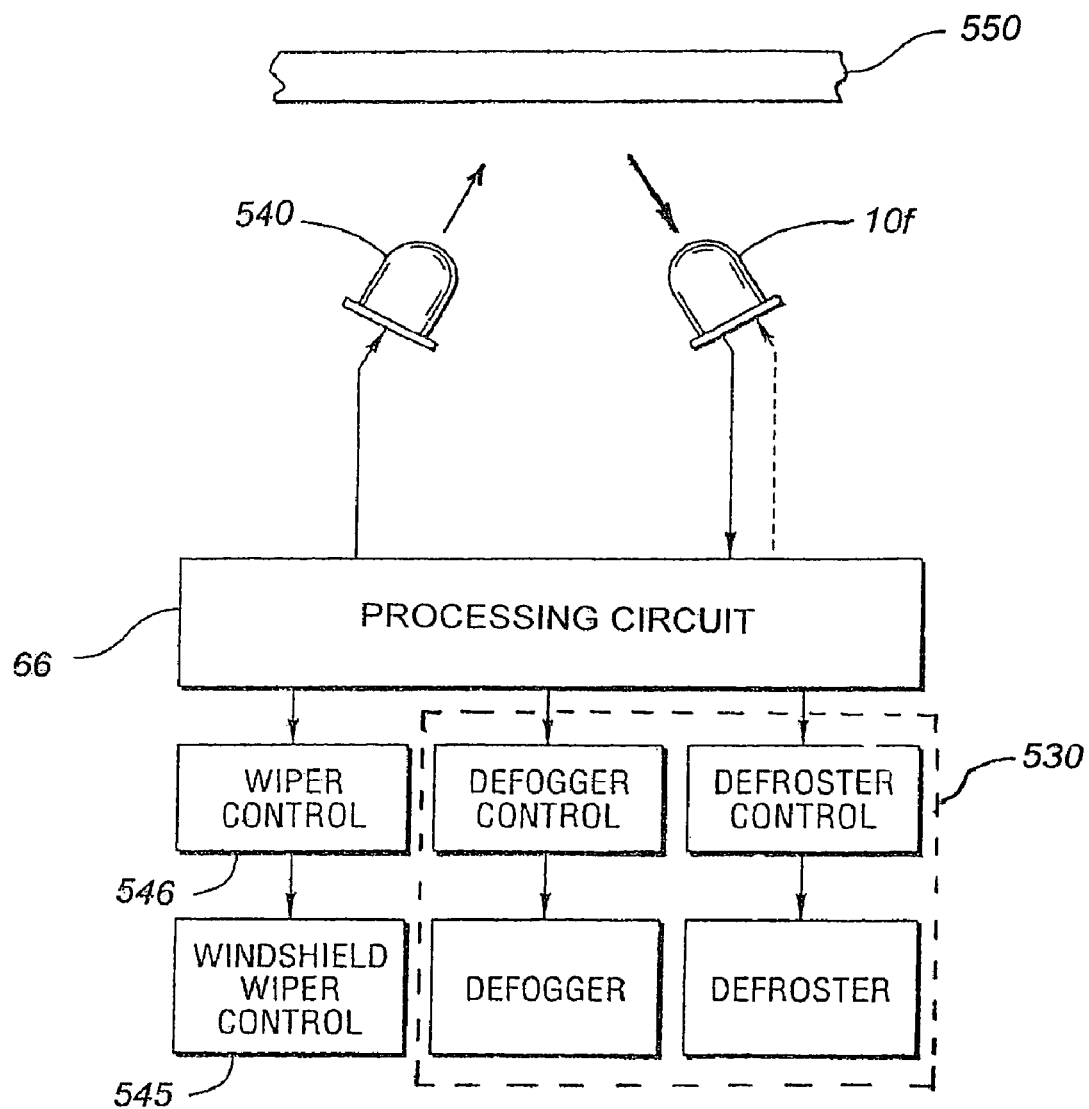
FIG. 12 is a side elevational view of a moisture detecting system employing the sensor device of the present invention.

FIG. 12 shows yet another automotive application for utilizing the inventive sensor construction. Specifically, FIG. 12 shows a moisture sensing system for detecting moisture (i.e., rain, mist, fog, frost, and snow) on the vehicle windshield. The system includes a light source such as an LED 540 and a sensor 10f. Optical radiation (i.e., visible light, or infrared or ultraviolet radiation) emitted from LED 540 enters the windshield 550 and is internally reflected therein and exits to impinge upon sensor 10f. If moisture is present on the windshield, the light from LED 540 does not reach sensor 10f and a processing circuit 66 (FIGS. 5 and 11) actuates the vehicle windshield wipers 545 via wiper control 546 and/or the windshield defogger of the vehicle climate control system 530.

While the above examples of automotive applications are described as being disposed in a rearview mirror assembly, it will be appreciated that some of the above applications may be implemented, in whole or in part, in other locations or vehicle accessories in the vehicle, such as the vehicle instrument panel, an A-pillar, a sun visor, or in an overhead console located on the headliner or on or near the windshield. Additionally, the sensor of the present invention may be employed in any other non-automotive application and the invention as broadly defined is not limited to any such application.

The above description is considered that of the preferred embodiment only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A vehicle equipment control, comprising:
   a sensing element for sensing optical radiation and generating an electrical output signal in response thereto mounted on a support structure;
   an encapaulant encapsulating said sensing element on said support structure, said encapsulant being configured to define an integrally formed optical radiation collector portion in physical contact with said sensing element for collecting and redirecting incident optical radiation toward said sensing element; and
   a controller configured to generate at least one vehicle equipment control signal as a function of said electrical output signal.

2. The vehicle equipment control of claim 1 wherein said at least one vehicle equipment control signal is configured to interact with vehicle equipment selected from the group comprising: windshield wiper, moisture sensor, defogger, defroster, heater, air conditioner, climate, head lamp, interior light and rearview mirror element.

3. The vehicle equipment control of claim 1 wherein said sensing element is configured in either a sky sensor, a sun load sensor, an ambient sensor or a glare sensor.

4. The vehicle equipment control of claim 1 wherein said sensing element is configured within a mount selected from; a rearview mirror assembly, vehicle accessories in the vehicle, vehicle instrument panel, an A-pillar, a sun visor, an overhead console, an overhead console located on the headliner, on the windshield or near the windshield.

5. The vehicle equipment control of claim 1 wherein said sensing element comprises:
   a light transducer exposed to light, the light transducer operative to accumulate charge in proportion to light incident over an integration period; and
   a sensor logic circuit in communication with the exposed light transducer, the sensor logic circuit operative to output a discrete light signal according to the accumuJated exposed light transducer charge.

6. A vehicle equipment control as in claim 1 further comprising a second sensing element.

7. A vehicle equipment control, comprising:
   a first sensing element for sensing optical radiation and generating a first electrical output signal in response thereto mounted on a support structure;
   a second sensing element for sensing optical radiation and generating a second electrical output signal in response thereto mounted on a support structure;
   an encapsulant encapsulating at least one of said sensing elements on at least one of said support structures, said encapsulant being configured to define an integrally formed optical radiation collector portion in physical contact with said sensing element for collecting and redirecting incident optical radiation toward the given sensing element; and
   a controller configured to generate at least one vehicle equipment control signal as a function of at least one of said first electrical output signal and said second electrical output signal.

8. The vehicle equipment control of claim 7 wherein said at least one vehicle equipment control signal is configured to interact with vehicle equipment selected from the group comprising: windshield wiper, moisture sensor, defogger, defroster, heater, air conditioner, climate, head lamp, interior light and rearview mirror element.

9. The vehicle equipment control of claim 7 wherein said first sensing element is configured in either a sky sensor, a sun load sensor, an ambient sensor or a glare sensor.

10. The vehicle equipment control of claim 7 wherein said second sensing element is configured in either a sky sensor, a sun road sensor, an ambient sensor or a glare sensor.

11. The vehicle equipment control of claim 7 wherein said first sensing element is configured within a mount selected from; a rearview mirror assembly, vehicle accessories in the vehicle, vehicle instrument panel, an A-pillar, a sun visor, an overhead console, an overhead console located on the headliner, on the windshield or near the windshield.

12. The vehicle equipment control of claim 7 wherein said second sensing element is configured in either a sky sensor, a sun load sensor, an ambient sensor or a glare sensor.

13. The vehicle equipment control of claim 7 wherein said first sensing element comprises:
   a light transducer exposed to light, the light transducer operative to accumulate charge in proportion to light incident over an integration period; and
   a sensor logic circuit in communication with the exposed light transducer, the sensor logic circuit operative to output a discrete light signal according to the accumulated exposed light transducer charge.

14. The vehicle equipment control of claim 7 wherein said second sensing element comprises:
   a light transducer exposed to light, the light transducer operative to accumulate charge in proportion to light incident over an integration period; and
a sensor logic circuit in communication with the exposed light transducer, the sensor logic circuit operative to output a discrete light signal according to the accumulated exposed light transducer charge.

15. A vehicle equipment control, comprising:
   at least one sensing element for sensing optical radiation and generating at least one electrical output signal in response thereto mounted on at least one support structure;
   an encapsulant encapsulating at least one of said sensing elements on at least one of said support structures, said encapsulant being configured to define an integrally formed optical radiation collector portion in physical contact with said sensing element for collecting and redirecting incident optical radiation toward the given sensing element; and
a controller configured to generate at least one vehicle equipment control signal as a function of at least one of said electrical output signals, wherein at least one vehicle equipment control signal is configured to interact with vehicle equipment selected from the group comprising: windshield wiper, moisture sensor, defogger, defroster, heater, air conditioner, climate, head lamp, interior light and rearview mirror element.

16. The vehicle equipment control of claim 15 wherein said sensing element is configured in either a sky sensor, a sun load sensor, an ambient sensor or a glare sensor.

17. The vehicle equipment control of claim 15 wherein said sensing element is configured within a mount selected from; a rearview mirror assembly, vehicle accessories in the vehicle, vehicle instrument panel, an A-pillar, a sun visor, an overhead console, an overhead console located on the headliner, on the windshield or near the windshield.

18. The vehicle equipment control of claim 15 wherein said sensing element comprises:

a light transducer exposed to light, the light transducer operative to accumulate charge in proportion to light incident over an integration period; and a sensor logic circuit in communication with the exposed light transducer, the sensor logic circuit operative to output a discrete fight signal according to the accumulated exposed light transducer charge.

19. A vehicle equipment control as in claim 15 further comprising a second sensing element.

20. The vehicle equipment control of claim 19 wherein said second sensing element is configured in either a sky sensor, a sun load sensor, an ambient sensor or a glare sensor.

* * * * *